US010894352B2

(12) United States Patent
Pranov et al.

(10) Patent No.: US 10,894,352 B2
(45) Date of Patent: Jan. 19, 2021

(54) METHOD AND APPARATUS FOR PRODUCING A HIGH ASPECT RATIO NANOSTRUCTURED FOIL BY EXTRUSION COATING OR EXTRUSION CASTING

(71) Applicants: INMOLD A/S, Taastrup (DK); Danapak Flexibles A/S, Slagelse (DK)

(72) Inventors: Henrik Pranov, Espergrerde (DK); Maria Matschuk, Bagsvaerd (DK); Sanne Norup Westad, Slagelse (DK); Peter Lass Johansen, Slagelse (DK); Ole Brodsgard, Slagelse (DK)

(73) Assignees: INMOLD A/S, Taastrup (DK); Danapak Flexibles A/S, Slagelse (DK)

( * ) Notice: Subject to any disclaimer, the term of this patent is extended or adjusted under 35 U.S.C. 154(b) by 0 days.

(21) Appl. No.: 16/724,978

(22) Filed: Dec. 23, 2019

(65) Prior Publication Data
US 2020/0139614 A1    May 7, 2020

Related U.S. Application Data

(62) Division of application No. 15/128,030, filed as application No. PCT/DK2015/000012 on Mar. 23, 2015, now Pat. No. 10,532,510.

(30) Foreign Application Priority Data

Mar. 24, 2014    (DK) .................................. 2014 00165

(51) Int. Cl.
*B29C 59/04* (2006.01)
*B29C 48/154* (2019.01)
(Continued)

(52) U.S. Cl.
CPC ............ *B29C 59/046* (2013.01); *B05D 1/265* (2013.01); *B29C 43/222* (2013.01); *B29C 43/46* (2013.01);
(Continued)

(58) Field of Classification Search
CPC .................................................. B29C 59/046
(Continued)

(56) References Cited

U.S. PATENT DOCUMENTS

| 4,486,377 A | 12/1984 | Lucchesi et al. |
| 10,532,510 B2 | 1/2020 | Pranov et al. |

(Continued)

FOREIGN PATENT DOCUMENTS

| EP | 1316402 A1 | 6/2003 |
| EP | 1700680 A1 | 9/2006 |

(Continued)

OTHER PUBLICATIONS

Makela, Continuous Double-Sided Roll-to-Roll Imprinting of Polymer Film, Japanese Journal of Applied Physics, vol. 47, No. 6, 2008, p. 5142-5144 (Year: 2008).*

*Primary Examiner* — Tabatha L Penny
(74) *Attorney, Agent, or Firm* — Holland & Hart LLP (57) ABSTRACT

A sold nano- or micro-structured thermoplastic foil including a nano- or micro-structured surface area is produced by providing an extrusion casting roller for an industrial polymer extrusion casting process using a thermoplastic material, applying a nano- or micro-structured surface on the extrusion casting roller, maintaining a temperature of the casting roller below a solidification temperature of the thermoplastic material while the casting roller and the counter roller are rotating, and continuously applying a melt of the thermoplastic material between a counter roller and the casting roller while the casting roller and the counter roller are rotating. A rotational velocity of the casting roller may be 10 meters/minute. The melt of the thermoplastic material is moved between the casting roller and the counter roller while the rollers are rolling, and the melt of the (Continued)

thermoplastic material is solidified upon contact with the casting roller to form the thermoplastic foil.

18 Claims, 3 Drawing Sheets

(51) Int. Cl.
  *B29C 48/25* (2019.01)
  *B29C 43/22* (2006.01)
  *B29C 43/46* (2006.01)
  *B05D 1/26* (2006.01)
  *B29C 59/02* (2006.01)
  *B29K 101/12* (2006.01)
  *B29K 105/20* (2006.01)

(52) U.S. Cl.
  CPC .......... *B29C 48/154* (2019.02); *B29C 48/251* (2019.02); *B29C 59/022* (2013.01); *B29C 2043/461* (2013.01); *B29C 2059/023* (2013.01); *B29K 2101/12* (2013.01); *B29K 2105/20* (2013.01); *B29K 2909/02* (2013.01); *B29K 2995/004* (2013.01); *B29K 2995/0093* (2013.01)

(58) Field of Classification Search
  USPC .......................................... 427/359
  See application file for complete search history.

(56) References Cited

U.S. PATENT DOCUMENTS

| | | |
|---|---|---|
| 2001/0000117 A1 | 4/2001 | Gorman et al. |
| 2003/0187170 A1 | 10/2003 | Burmeister |
| 2007/0013103 A1* | 1/2007 | Zhang .................. B82Y 30/00 264/284 |
| 2007/0126145 A1 | 6/2007 | Coyle |
| 2007/0151468 A1 | 7/2007 | Strand |
| 2009/0087506 A1 | 4/2009 | Hasegawa et al. |
| 2009/0183643 A1 | 7/2009 | Yang et al. |
| 2009/0257056 A1* | 10/2009 | Demirel ................ B82Y 30/00 356/301 |
| 2010/0075069 A1 | 3/2010 | Laney et al. |
| 2011/0318535 A1 | 12/2011 | Jung et al. |
| 2016/0107371 A1 | 4/2016 | Hurme et al. |

FOREIGN PATENT DOCUMENTS

| | | | |
|---|---|---|---|
| EP | 2422964 A2 | 2/2012 | |
| EP | 2657004 A1 | 10/2013 | |
| WO | WO-2006032494 A1 | 3/2006 | |
| WO | WO-2007126607 A1 | 11/2007 | |
| WO | WO-2012000500 A1 * | 1/2012 | ......... B29C 33/3842 |
| WO | WO-2012100500 A1 | 1/2012 | |
| WO | WO-2014053706 A1 | 4/2014 | |

* cited by examiner

METHOD AND APPARATUS FOR PRODUCING A HIGH ASPECT RATIO NANOSTRUCTURED FOIL BY EXTRUSION COATING OR EXTRUSION CASTING

CROSS-REFERENCE TO RELATED APPLICATIONS

The present application is a divisional of U.S. patent application Ser. No. 15/128,030 by Pranov et al., entitled "METHOD AND APPARATUS FOR PRODUCING A HIGH ASPECT RATIO NANOSTRUCTURED FOIL BY EXTRUSION COATING OR EXTRUSION CASTING," filed 21 Sep. 2016, which is a 371 national phase filing of International Application No. PCT/DK2015/000012, entitled "METHOD AND APPARATUS FOR PRODUCING A HIGH ASPECT RATIO NANOSTRUCTURED FOIL BY EXTRUSION COATING OR EXTRUSION CASTING", filed 23 Mar. 2015, which claims priority to Denmark Patent Application No. PA 2014 00165, entitled "METHOD AND APPARATUS FOR PRODUCING A HIGH ASPECT RATIO NANOSTRUCTURED FOIL BY EXTRUSION COATING OR EXTRUSION CASTING", filed 24 Mar. 2014.

BACKGROUND

Field of the Disclosure

The present disclosure relates to a method and apparatus for manufacturing foils with a thermoplastic surface comprising high-aspect ratio micro or nanostructures.

Background of the Disclosure

In biotechnological, medical and consumer applications, it is desirable to apply functional structures e.g. nanostructures, to defined areas of articles for use as functional surfaces, altering the properties of the surface relative to that of an unstructured surface. Examples of desirable functions are self-cleaning or super repellent surfaces. A method of producing such articles independently of the overall macro-geometry is desirable, in particular if such articles are mass produced at a relative low price as many of these articles must be disposable or low cost reusable products, e.g. toys or packaging material.

The most commonly used method for making controlled micro or nanostructures in thermoplastic surfaces are variotherm injection molding type processes. By melting a thermoplastic material and injecting it into a heated mold under high pressure, the surface of the mold will be replicated, thereby generating a micro or nanostructures polymeric replica. The most common application of this is CD/DVD/Blu-Ray manufacturing, where a polymeric replica may be made in a few seconds. However, the molding of high aspect ratio structures, where the width is low and the depth is high, is challenging using these types of processes due to the rapid cooling of the melt surface upon injection into the cold mold. One solution to this problem has been to vary the temperature of the mold during the process in a variotherm process where the mold is heated above the solidification temperature during melt injection and subsequently cooled below the solidification temperature in order to make the polymeric part solidify so it can be removed from the mold. This, however, increases the cycle times considerably.

Embossing processes are closely related to the variotherm injection molding types of process, where a solid thermoplastic substrate, typically a foil, is being heated while in contact with a master structure made by conventional lithographic means, the master structure typically consist of a nickel or silicon or silicone (PDMS) shim or stamp. After heating and shaping of the surface topography of the substrate to be the inverse of the master structure, the master and substrate is cooled below the solidification temperature of the substrate, and the substrate may be removed. Typical processing throughputs of these types of processes are, cm2 per heating/cooling cycle which typically takes from 10 s and up to several minutes depending on the apparatus, giving a productivity on the order of 10-100 cm2/s equaling 0.001-0.01 m2/s.

Some reports of high speed replication have been given, but only for low aspect ratio structures, typically decorative or diffractive structures.

For many applications these throughput rates are several orders of magnitude tog slow. Applications such as functionalized foils for food packaging, coating of windows, ships or car windshields with self cleaning surfaces all require throughputs on the order of 1 m2/s or higher in order to be economically feasible.

Due to the abovementioned problems with the state-of-the-art, it would be desirable to have a technological solution, where high aspect ratio micro or nanostructures may be formed in foils at low cost at high throughput rates. It would further be advantageous if this solution could provide micro or nanostructures of a high quality and it would be a further advantage if the micro or nanostructured area could cover the whole area of the manufactured foil.

SUMMARY

To overcome the abovementioned problems of state-of-the-art a disclosure providing the technological solution with the abovementioned desired properties is here presented.

In an example, an extrusion coating or casting type technology may be used to coat or produce generic foils with a thin layer of a thermoplastic material, which is micro or nanostructured during the coating process.

Extrusion coating is a process where a carrier foil is moved between two rollers, a cooling roller and a counter roller, respectively. A polymeric melt is applied between the foil and the cooling roller in a continuous process. Upon contact with the cooling roller, the thermoplastic melt solidifies, and upon contact with the carrier foil, the thermoplastic melt is adhered to the carrier foil. The result is a carrier foil coated with a thin layer of a thermoplastic material.

Extrusion casting is a process where a thermoplastic melt is moved between two rollers, a cooling roller and a counter roller, respectively. The thermoplastic melt is applied between the foil and the cooling roller in a continuous process. Upon contact with the cooling roller, the thermoplastic melt solidifies forming a thermoplastic foil. Extrusion casting is essentially the same process as extrusion coating, where the carrier foil is omitted, and extrusion coating will be descriptive to both the extrusion coating and the extrusion casting processes in this description, unless specifically stated.

The present disclosure describes a process that may produce micro or nanostructured thermoplastic coatings by micro or nanostructuring the cooling roller and by carefully choosing the extrusion coating process parameters. This process may enable production at high throughput rates. So far throughput rates of up to 0.5 m2/s have been demonstrated in pilot production setup, and using full scale production equipment, rates of 5-10 m2/s may be achieved. In order for the process to work, micro or nanostructured cooling rollers are required. Therefore, a method for micro or nanostructuring cooling rollers is also described.

The novelty and inventive step of the disclosure is realized by the surprisingly high throughput and surface quality of the process, as well as the ability of the process to make continuous areas of micro or nanostructures without significant seam lines and the ability to cover the whole area of the manufactured foil.

It may be seen as an object of the present disclosure to provide an improved method for producing large areas of foil with micro or nanostructured thermoplastic coating at either a throughput rate larger than today's state-of-the-art, at a substantially lower cost than the cost associated with today's state-of-the-art processes, or with a substantially better quality of replication of the micro or nanostructures than state-of-the-art processes.

It is a further object of the disclosure to enable production of spatially continuous micro or nanostructures without visible seam lines.

It is a further object of the present disclosure to provide an alternative to the prior art.

The disclosure relates to a method for producing a nanostructured thermoplastic polymer coating on a carrier foil comprising at least one high aspect ratio nanostructured surface area, said method comprising at least the following steps:
- providing an initial extrusion coating roller for an industrial polymer extrusion coating process using a thermoplastic material
- applying a high aspect ratio nanostructured surface on the said extrusion coating roller thereby forming a high aspect ratio nanostructured extrusion coating roller
- maintaining the temperature of the said high aspect ratio nanostructured extrusion coating roller below the solidification temperature of the said thermoplastic material
- moving a carrier foil between the rotating high aspect ratio nanostructured extrusion coating roller and a rotating counter pressure roller at a given velocity corresponding to the rotational velocity of the rotating high aspect ratio nanostructured extrusion coating roller
- continuously applying a melt of said thermoplastic material between the said moving carrier foil and the said rotating high aspect ratio nanostructured extrusion roller, whereby said thermoplastic melt is solidified upon contact with said high aspect ratio nanostructured extrusion coating roller maintained at a temperature below the solidification temperature of the said thermoplastic melt thereby forming a solid high aspect ratio nanostructured thermoplastic coating on said carrier foil.

The disclosure furthermore relates to a method for producing a high aspect ratio micro or nanostructured thermoplastic polymer foil comprising at least one high aspect ratio nanostructured surface area, said method comprising at least the following steps:
- providing an initial extrusion roller for an industrial polymer extrusion casting process using a thermoplastic material
- applying a high aspect ratio nanostructured surface on the said extrusion roller thereby forming a high aspect ratio nanostructured extrusion coating roller
- maintaining the temperature of the said high aspect ratio nanostructured extrusion roller below the solidification temperature of the said thermoplastic material
- continuously applying a melt of said thermoplastic material between the said counter roller and the said rotating high aspect ratio nanostructured extrusion roller, whereby said thermoplastic melt is solidified upon contact with said high aspect ratio nanostructured extrusion roller maintained at a temperature below the solidification temperature of the said thermoplastic melt thereby forming a solid high aspect ratio nanostructured thermoplastic foil.

The disclosure furthermore relates to a method where the aspect ratio of the said nano or microstructure is above 2, more preferably above 1.5, even more preferably above 1.25, and most preferable more than 1.

The disclosure furthermore relates to a method, where high aspect ratio nanostructures are produced on both sides of the cast foil by using both a high aspect ratio nanostructured extrusion roller and a high aspect ratio nanostructured counter roller.

The disclosure furthermore relates to a method where the said high aspect ratio nanostructured surface is applied by mounting high aspect ratio nanostructured shims on the said initial extrusion coating roller.

The disclosure furthermore relates to a method where the high aspect ratio nanostructured surface is applied by coating the said initial extrusion coating roller with a material which is subsequently high aspect ratio nanostructured.

The disclosure furthermore relates to a method where the said material is a ductile ceramic material precursor which is nanostructured by embossing and where said ductile ceramic material precursor is subsequently cured to form a solid high aspect ratio nanostructured ceramic material.

The disclosure furthermore relates to a method where the high aspect ratio nanostructured area of the said foil is spatially continuous over a length higher than the circumference of the said high aspect ratio nanostructured extrusion roller.

The disclosure furthermore relates to a method where the seam lines between individual high aspect ratio nanostructured areas have a width of preferably less than 50 µm, more preferably less than 20 µm, more preferably less than 10 µm, even more preferably less than 5 m and most preferably less than 2 µm.

The disclosure furthermore relates to a method where the said high aspect ratio nanostructuring of the said thermoplastic coating or foil provides a functionality of increased contact to water angle of at least 30 degrees relative to an otherwise identical, but non-structured thermoplastic coating.

The disclosure furthermore relates to a method where the foil is subsequently metalized in order to form isolated metal domains on top of the high aspect ratio nanostructures with a lateral size and thickness below 1000 nm.

The disclosure furthermore relates to a method where the said velocity of the carrier foil and the rotational velocity of the said micro or nanostructured is higher than 10 m/min, preferably higher than 15 m/min, more preferably higher than 25 m/min, even more preferably higher than 50 m/min and most preferably higher than 200 m/min.

The disclosure furthermore relates to a method where the said thermoplastic polymer is a semi crystalline polymer. Semi-crystalline polymers can under special circumstances act like super cooled liquid. These circumstances are present in the given process, as there is a very high cooling rate, and at the same time an applied pressure, which ensures that the polymer can replicate the shaping surface of the cooling roller before the melt solidifies, which happens when the amount of material which has crystallized has reached a certain level. This also indicates that semi crystalline polymers with slower crystallization rates will perform better in the process.

The disclosure furthermore relates to a method where the said thermoplastic polymer melt is kept in protected atmosphere in order to maintain the chemical properties of the polymeric material.

The disclosure furthermore relates to a foil with a high aspect ratio nanostructured thermoplastic coating.

BRIEF DESCRIPTION OF THE DRAWINGS

The method and apparatus according to the disclosure will now be described in more detail with regard to the accompanying figures. The figures show one way of implementing the present disclosure and is not to be construed as being limiting to other possible embodiments falling within the scope of the attached claim set.

DETAILED DESCRIPTION

The present disclosure solves numerous problems in state-of-the-art industrial polymer shaping of micro and nanostructures. Current technologies for making controlled micro or nanostructured thermoplastic surfaces have a problem of limited productivity, as they typically requires the shaping surface to be heated above the solidification temperature of the thermoplastic material during contact, and cooled below the solidification temperature after replication of the surface topography and a problem of limited aspect ratio of the structures that may be produced. Heating and cooling are relatively slow processes, thereby leading to increased cycle times and reduced productivity. A good example of this is roll-to-roll embossing where a master structure is mounted on a roll, heated, pressed into a thermoplastic foil, cooled down and the polymeric replica may be removed. These type of processes typically have a productivity of 0.01 m2/s utilizing expensive equipment.

The present disclosure describes a method for making large areas of high aspect ratio micro or nanostructured foil using existing extrusion coating equipment, with a productivity of up to several m2/s. Furthermore, large continuous area may be made with none or negligible seam lines. The disclosed method utilizes a conventional extrusion coating cooling roller which is modified to form a micro or nanostructured extrusion coating cooling roller. This modified roller is then used in a conventional extrusion coating process, resulting in surprisingly well-defined and well-replicated micro or nanostructures in the surface of the coated foil, which may be manufactured at a surprisingly high rate. This is especially true for semi crystalline polymers, where the rapid cooling upon contact with the cooling roller surprisingly does not result in rapid solidification, but rather that the polymer melt behaves like a super cooled liquid during the replication process, ensuring good replication quality of even high aspect ratio structures, which would not be replicated if the polymer melt viscosity was related to the temperature alone. This is especially noted by the difficulties to replicate high aspect ratio structures in most amorphous polymer types.

In one embodiment of the disclosure, the conventional extrusion coating cooling roller is modified by adhering pre-made micro or nanostructures shims to the surface of the conventional extrusion coating cooling roller. This will result in significant seam lines between individual shims, however, in many applications there is no need for a continuous area with a size larger than a shim.

In a second embodiment the conventional extrusion coating cooling roller is coated by a thin layer of a ductile material, the ductile material may be micro or nanostructured by a step-and-repeat embossing process, where a master micro or nanostructure is pressed into the ductile material, thereby replicating master structure, generating the inverse surface topography in the ductile material. The ductile material may then subsequently be hardened by heat curing, UV radiation or other means. The step-and-repeat embossing process may be performed at a high precision, such that no visible seam lines are formed between individually embossed areas on the modified conventional extrusion coating cooling roller. This will result in a foil with a continuous micro or nanostructured area.

In a first example a ⌀300 mm, 600 mm wide extrusion roller is mounted with 300 µm thin nickel shims with a diffraction grating topography. A polyethylene melt is extrusion coated onto a PET carrier foil at a velocity of 30 m/min, resulting in the production of a foil covered with diffraction gratings defined in the polyethylene coating which is laminated to the PET carrier foil.

In a second example a ⌀300 mm, 600 mm wide extrusion roller is coated with a 2 µm layer of HSQ, which is structured by step-and-repeat embossing of a self-cleaning nanostructure. The HSQ coating is thermally cured, and the nanostructured roller is used for the extrusion coating process. A stretchable laminate foil with a hotmelt backing is used as carrier foil and a polypropylene thermoplastic melt is applied to the carrier foil at 60 m/min. Thereby 0.6 m2/s of self-cleaning foil is produced. The produced foil is laminated to windows in order to make them self-cleaning.

In a third example a ⌀1000 mm, 2500 mm wide extrusion roller is coated with a 2 µm layer of HSQ, which is structured by step-and-repeat embossing of a friction lowering nanostructure. The HSQ coating is thermally cured, and the nanostructured roller is used for the extrusion coating process. A stretchable laminate foil with a hotmelt backing is used as carrier foil and a polypropylene thermoplastic melt is applied to the carrier foil at 60 m/min. Thereby 0.6 m2/s of friction lowering foil is produced. The foil is laminated to cover a ship hull, thereby reducing the friction of the ship, and hence reducing CO2 emissions or increasing the top speed.

In a fourth example ⌀1000 mm, 2500 mm wide extrusion roller is coated with a 2 µm layer of HSQ, which is structured by step-and-repeat embossing of a yoghurt repellent microstructure. The HSQ coating is thermally cured, and the nanostructured roller is used for the extrusion coating process. A cardboard foil is used as carrier foil and a polypropylene thermoplastic melt is applied to the carrier foil at 200 m/min. Thereby 5 m2/s of food repellent cardboard foil is produced, which is used for yoghurt packaging, ensuring that the yoghurt packaging may be completely emptied, thereby reducing food waste.

In a fifth example a Poly-acrylo-nitrile (PAN) melt is blown extruded at 240 C with cooling roller and counter roller maintained at 70 C. The cooling roller comprises decorative structures and has a width of 1.5 m. A 20 µm thin PAN-foil comprising decorative structures is produced at a rate of 0.5 m/s, giving a productivity of 0.75 m2/s of decorative foil used for plastic bags.

In sixth example a 30 µm thick polystyrene (PS) foil is extrusion cast with nanostructured rollers on both sides, resulting in a PS foil with structures on both sides. The rollers comprise cell active structures, resulting in a PS foil comprising structures which has a biological activity. The PS foil is corona treated in line, and cut out in small, hexagonal pieces with a dimension of 30 µm*100 µm*100 µm. The hexagonal pieces are then used as micro beads in adherent cell proliferation reactors with the main purpose of inducing a more natural cell behavior and the secondary purpose of vastly increasing the available surface area for the cells.

Figure 1:
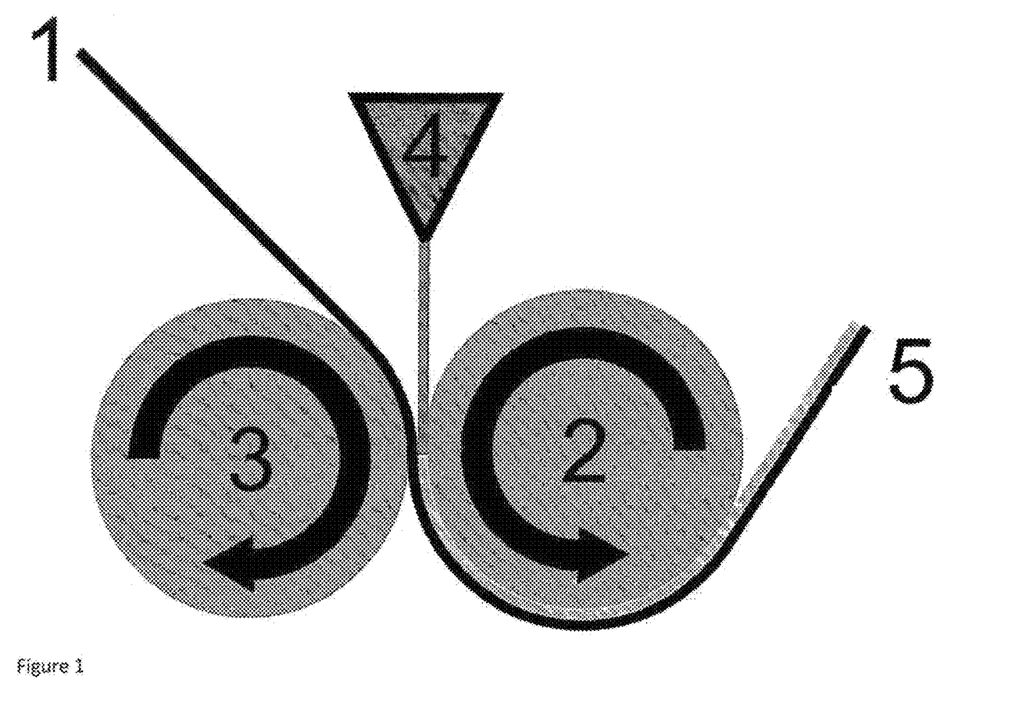
FIG. 1 shows an example of a technique for manufacturing a micro or nanostructured polymer coating applied onto carrier foils using a micro or nanostructured roller.

The disclosure here presented regards the process of manufacturing of a micro or nanostructured polymer coating applied onto carrier foils by the use of a micro or nanostructured roller. One embodiment of the technique is shown in FIG. 1. A carrier foil (1) is passed between the micro or nanostructured roller (2) and a counter roller (3). A thermoplastic melt is deposited between the micro or nanostructured roller (2) and the carrier foil (1). The micro or nanostructured roller is kept at a temperature below the solidification temperature of thermoplastic melt. The micro or nanostructured roller and the counter roller rotates as indicated by the arrows, thereby moving the carrier foil while laminating the thermoplastic melt to the carrier foil. Upon contact between the thermoplastic melt (4) and the micro or nanostructured roller (2), a simultaneous cooling and shaping of the thermoplastic melt occurs, thereby forming a micro or nanostructured and solid thermoplastic coating which is laminated to the carrier foil, thereby forming a carrier foil comprising a micro or nanostructured thermoplastic coating (5). The rotational velocity of the rollers time the width of the foil equals the throughput of the process or the rate of which micro or nanostructured surface is produced. Typical widths of rollers are from 10's of cm to several meters, and typical rotational velocities are from 10 to 300 meter/minute. The applicants have demonstrated successful production of both micro and nanostructured thermoplastic coatings with rotational velocities up to 60 m/min, on a roller 50 cm wide, resulting in a production rate of 30 m2/min or 0.5 m2/s.

Figure 2:
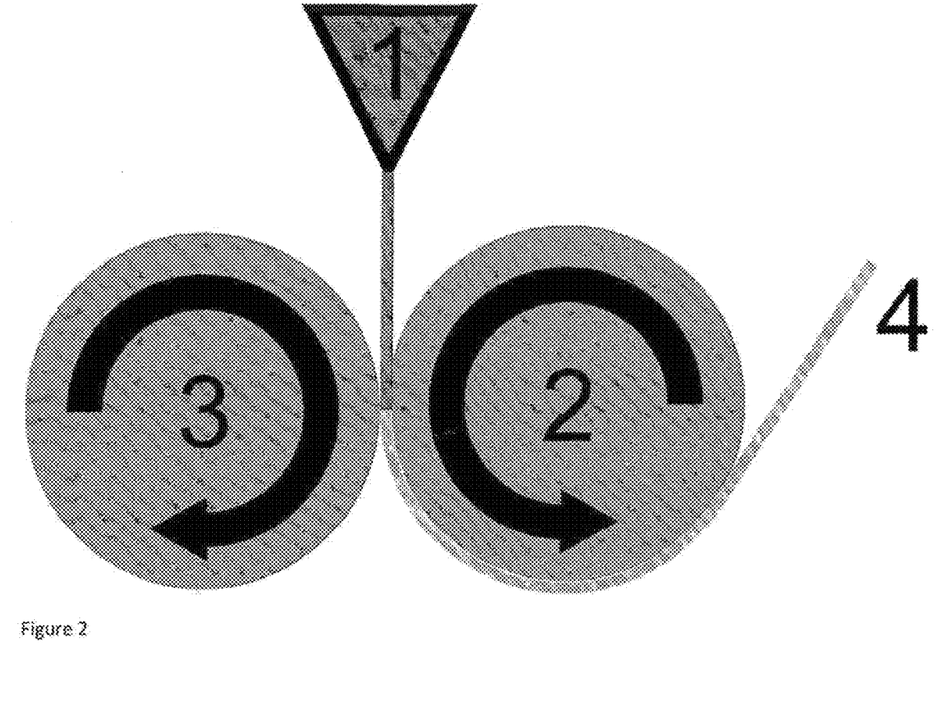
FIG. 2 shows another example of a technique for manufacturing a micro or nanostructured polymer coating applied onto carrier foils using a micro or nanostructured roller.

Another embodiment is shown in FIG. 2. A thermoplastic melt is (1) is passed between the micro or nanostructured roller (2) and a counter roller (3). The micro or nanostructured roller is kept at a temperature below the solidification temperature of thermoplastic melt. The micro or nanostructured roller and the counter roller rotates as indicated by the arrows, thereby moving the thermoplastic melt. Upon contact between the thermoplastic melt (1) and the micro or nanostructured roller (2), a simultaneous cooling and shaping of the thermoplastic melt occurs, thereby forming a micro or nanostructured and solid thermoplastic foil (4). The rotational velocity of the rollers time the width of the foil equals the throughput of the process or the rate of which micro or nanostructured surface is produced. Typical widths of rollers are from 10's of cm to several meters, and typical rotational velocities are from 10 to 300 meter/minute. The applicants have demonstrated successful production of high aspect ratio micro and nanostructured thermoplastic foils with rotational velocities up to 60 m/min, on a roller 50 cm wide, resulting in a production rate of 30 m2/min or 0.5 m2/s.

The roller may be made by different techniques. One technique for manufacturing such a micro or nanostructured roller is by the application of a thin layer of liquid ceramic material precursor solution, directly on the surface of a conventional high surface roughness roller, allowing the solvent of the liquid ceramic precursor solution to evaporate in order to form a ductile film of ceramic material precursor, structuring the film of ductile ceramic material precursor by a mechanical process such as embossing, curing it to a film of structured solid ceramic material and using it for the purpose of the disclosure. Another method for manufacturing the micro or nanostructured roller is a shim approach, where shims containing the micro or nanostructure are mounted on the roller by means of welding, gluing, taping, magnetism or other means. The shims are typically manufactured by conventional lithographic means, such as deep UV lithography, photolithography, electron beam lithography, electroplating, dry or wet etching, step-and-repeat nano imprint lithography, embossing or by other means to make a micro or nanostructured surface. The shims typically consists of thin nickel or silicon plates cut out in the desired shape, and may be placed in close vicinity to each other in order to cover most of the surface area of the roller. This method, however, will make visible seam lines between the individual shims, which will typically have a width of minimum 10-100 µm, depending on the precision of the cutting and mounting tools used.

Figure 3:
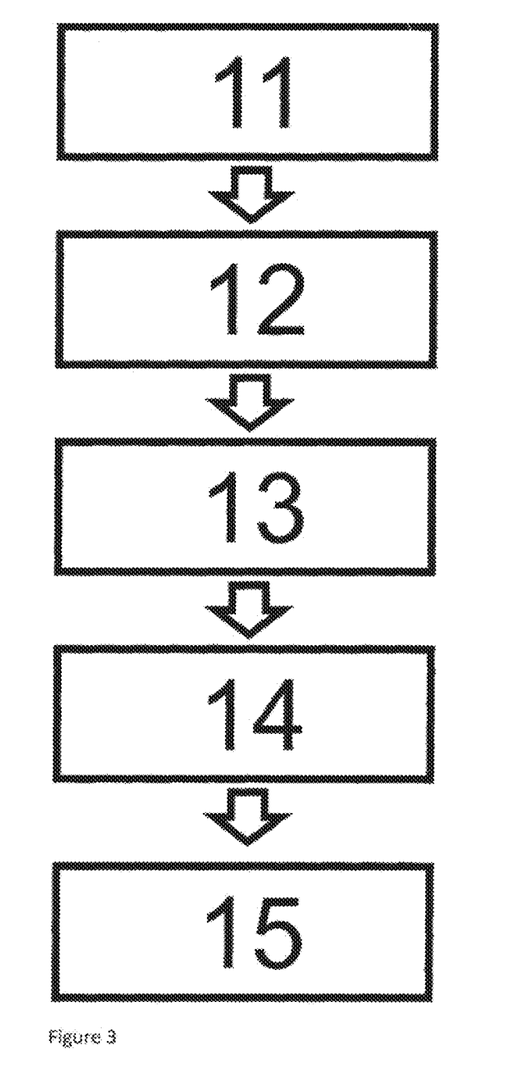
FIG. 3 shows a flow-chart of a method for making the micro or nanostructured foil.

FIG. 3 shows a flow-chart of a method for making the micro or nanostructured foil. First an initial extrusion coating roller for an industrial polymer extrusion coating process using a thermoplastic material is provided (11), then a micro or nanostructured surface on the said extrusion coating roller is applied (12) thereby forming a micro or nanostructured extrusion coating roller (13) which is maintained at a the temperature below the solidification temperature of the said thermoplastic material. A carrier foil is placed between the rotating micro or nanostructured extrusion coating roller and a rotating counter pressure roller, thereby being moved at a given velocity corresponding to the rotational velocity of the rotating micro or nanostructured extrusion coating roller (14). By continuously applying a melt of said thermoplastic material between the said moving carrier foil and the said rotating micro or nanostructured extrusion roller, the said thermoplastic melt is solidified upon contact with said micro or nanostructured extrusion coating roller maintained at a temperature below the solidification temperature of the said thermoplastic melt thereby forming a solid micro or nanostructured thermoplastic coating on said carrier foil (15).

A micro or nanostructured foil is herein defined as an article, e.g., a packaging material, a decorative surface, a toy, a container or part of a container or a part of a medical device or a functional part of a medical device where the micro or nanostructure is intended to be able to change the surface properties of the material, non-limiting examples given; changing the hydrophilicity, molecular binding properties, sensing properties, biological properties or facilitating biological process, the optical, reflective or diffractive properties, its tactile properties or holographic properties.

By carrier foil is meant a thin substrate which is flexible and may be processed using roll-to-roll technologies. Non-limiting examples of foils are polymeric foils, cardboard foils or metal foils or foils comprised of more than one of these types, e.g. a metal-polymeric foil.

By micro or nanostructured thermoplastic polymer coating is meant a thin layer of a thermoplastic material that is applied to the carrier foil during the extrusion process, where the side not facing the carrier foil have a controlled micro or nanometer sized topography.

By a micro or nanostructured surface is meant a part of a surface containing controlled topographical micro or nanostructures.

By extrusion coating is meant the process of coating a foil in a continuous roll-to-roll process, as described in the literature, see e.g. Gregory, B. H., "Extrusion Coating", Trafford, 2007, ISBN 978-1-4120-4072-3

By extrusion coating roller is meant the cooling roller contacting the melt in the extrusion coating process, thereby solidifying the melt, thereby transforming the melt into a solid.

By extrusion roller is meant the cooling roller contacting the melt in the extrusion casting process, thereby solidifying the melt, thereby transforming the melt into a solid.

By a micro or nanostructured extrusion coating roller is meant an extrusion coating roller containing controlled micro or nanostructures on at least part of the outer surface which are in contact with the thermoplastic melt during the extrusion coating process.

By a micro or nanostructured extrusion roller is meant an extrusion roller containing controlled micro or nanostructures on at least part of the outer surface which are in contact with the thermoplastic melt during the extrusion casting process.

By controlled micro or nanostructures are meant deterministic structures, fabricated with the intent of making structures with a given topography, length scale or other functional property. Typical methods for making controlled micro or nanostructures are lithographic methods, such as, but not limited to electron beam lithography, laser writing, deep ultraviolet stepping lithography, optical lithography, nano imprint lithography, self-assembling lithography, embossing, colloid lithography, reactive ion etching, wet etching, metalization or other methods well known in the literature, see e.g. "Microlithography Fundamentals in Semiconductor Devices and Fabrication Technology" by Nonogaki et al, 1998 or "Microlithography: Science and Technology" by James R. Sheats and Bruce W. Smith, 1998 or "Principles Of Lithography, 3rd edition" by Harry J. Levinson, 2011.

By spatially continuous is meant an area which does not have any by eye visible seam lines.

By seam lines is meant a line defect between two areas due to imperfect alignment of the said areas relative to each other.

By solidification temperature is meant the temperature at which a thermoplastic material is transformed from a liquid state to a solid state. For a description of thermoplastics and their behavior around the solidification temperature, see e.g. Tim Osswald and Juan P. Hernandez-Ortiz, Polymer Processing—Modeling and simulation, Munich [u.a.]: Hanser, 2006. If no well-defined solidification temperature exist for the material, the Vicat softening point may be used instead, see e.g. ASTM D1525-09 Standard Test Method for Vicat Softening Temperature of Plastics.

By counter pressure roller is meant the roller exerting pressure on the carrier foil, the thermoplastic melt and the extrusion coating roller in the extrusion process.

By rotational velocity is meant the velocity of the surface of a roller, corresponding to the velocity of a foil in contact with the said roller under no-slip conditions.

By a melt is meant a thermoplastic material above its solidification temperature.

By a solid thermoplastic is meant a thermoplastic material below its solidification temperature.

By shims is meant inserts capable of being mounted on the extrusion coating roller, typically comprising micro or nanostructures in the surface. These inserts typically consists of nickel or silicon.

By functionality is meant a change in the material properties relative to a non-structured material. Examples of functionalities that may be induced by micro or nanostructuring are such as but not limited to one of the following; increased or decreased contact angle relative to a liquid, self-cleaning properties, diffractive properties, improved welding properties, friction lowering or increasing properties, decreased reflective properties, food repellent properties, holographic properties, iridescent colors, structural colors, anti-fouling or anti-bacterial properties, identificational or information containing properties, biological functional properties, decorative or tactile properties.

By identificational is meant a recognizable topography, allowing an observer to conclude if the sample on which the identificational structure is placed is a genuine or a counterfeit product.

By liquid or ductile ceramic precursor material or liquid or ductile ceramic material precursor solution is meant a liquid or ductile material or solution of material that upon curing is capable of forming a solid, non-ductile ceramic material. As a way of example and not by way of limitation the said ceramic material precursors could be hydrogen silsesquioxane (HSQ) or methyl silsesquioxane (MSQ), capable of forming $SiO_2$ upon thermal curing at 600° C. for 1 hour.

By liquid or ductile is meant a material capable of being permanently, non-elastically deformed upon mechanical deformation, which comprises both low-viscosity liquids, such as water and organic solvents and high-viscosity and ductile substances capable of being plastically deformed, such as HSQ or MSQ.

By solid is meant a material not able to be plastically deformed at the conditions present in the polymer shaping process without fracturing the material or breaking covalent bonds in the material structure, non-limiting examples being $SiO_2$, glass, $Si_3N_4$, SiC, $Al_2O_3$, TiAlN, $TiO_2$, $Ti_3N_2$, $B_2O_3$, $B_4C$ or BN.

By ceramic material is meant both crystalline and amorphous materials consisting of metals or metalloid covalently bound to non-metal and non-metalloid atoms. As a way of example and not by way of limitation the said ceramic material could contain the following materials or mixtures thereof. $SiO_2$, glass, $SbN_4$, SiC, $Al_2O_3$, TiAlN, $TiO_2$, $Ti_3N_2$, $B_2O_3$, $B_4C$ or BN.

By coating is meant the process of applying a layer of the liquid or ductile ceramic precursor or precursor solution to the shaping surface of the said mold or mold insert. As a way of example and not by way of limitation the said coating method could comprise spin coating, spray coating or coating by submersion of the mold or mold insert into the said liquid or ductile ceramic material precursor or precursor solution.

By casting is meant the process of solidifying a melt into a solid foil by moving the melt between two rotating rollers whose temperature is maintained below the solidification temperature of the melt, see e.g. "Plastics Extrusion Technology, 2nd edition" by Hensen, 1997.

By an embossing process is meant bringing a primary nanostructure into mechanical contact with the layer of liquid or ductile ceramic material precursor or precursor solution, whereby the inverse form of the primary nanostructure is formed in the layer of liquid or ductile ceramic material precursor or precursor solution. The structuring process may take place at an elevated temperature (hot embossing) in order to non-elastically or permanently deform the layer of liquid or ductile ceramic material precursor or precursor solution. The embossing process may incorporate the curing process, in such a way that the liquid or ductile ceramic material precursor or precursor solution is cured while the primary nanostructure is in contact with the liquid or ductile ceramic material precursor or precursor solution, a non-limiting example being the irradiation curing in step-and-flash NIL.

By curing is meant the process of transforming the liquid or ductile ceramic material precursor or liquid or ductile ceramic material precursor solution into the resulting solid ceramic material. This is typically done by covalent cross-linking of smaller molecular entities into a mesh structure, forming a solid ceramic substance. As a way of example and not by way of limitation the said curing method could be e.g. thermal curing where the ceramic precursor material is heated to a temperature where the cross linking takes place spontaneously, or the curing method could be a plasma curing where a plasma interacts chemically with the ceramic precursor material, thereby cross linking the ceramic precursor material, or the curing method could be an irradiation curing, where ionizing irradiation (e.g. UV exposure or electron irradiation) forms radicals in the ceramic material precursor or precursor solvent, causing the precursor to crosslink.

By thermoplastic materials are meant polymeric materials capable of being molten and solidified by changing the temperature to be above or below the solidification temperature of the material, respectively. Non-limiting examples of thermoplastic polymer that may be used are acrylonitrile butadiene styrene (ABS), acrylic, celluloid, cellulose acetate, Ethylene-Vinyl Acetate (EVA), Ethylene vinyl alcohol (EVAL), Fluoroplastics, gelatin, Liquid Crystal Polymer (LCP), cyclic oleofin copolymer (COC), polyacetal, polyacrylate, polyacrylonitrile, polyamide, polyamide-imide (PAI), polyaryletherketone, polybutadiene, polybutylene, polybutylene therephthalate, polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherimide (PEI), polyethersulfone (PES), Polyethylenechlorinates (PEC), polyimide (PI), polylactic acid (PLA), Polymethylpentene (PMP), polyphenylene oxide (PPO), polyphenylene sulfide (PPS), polyphthalamide (PPA), polypropylene (PP), polystyrene (PS), polysulfone (PSU), polyurethane (PU), polyvinyl acetate (PVA), polyvinyl chloride (PVC), polyvinylidene chloride (PVDC) and styrene-acrylonitrile (SAN), a polymer matrix substance for a medical drug, or mixes or copolymers thereof.

In some embodiments the micro or nanostructure comprises controlled micro or nanostructures made by lithographic or holographic means with a characteristic minimum feature size of less than 1 μm.

All of the features described may be used in combination so far as they are not incompatible therewith.

Although the present disclosure has been described in connection with the specified embodiments, it should not be construed as being in any way limited to the presented examples. The scope of the present disclosure is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the disclosure. Furthermore, individual features mentioned in different claims, may possibly be advantageously combined, and the mentioning of these features in different claims does not exclude that a combination of features is not possible and advantageous.

All patents and non-patent references cited in the present application are also hereby incorporated by reference in their entirety.

What is claimed is:

1. A method for producing a nano- or micro-structured thermoplastic foil comprising at least one nano- or micro-structured surface area, comprising:
    providing an extrusion casting roller for an industrial polymer extrusion casting process using a thermoplastic material;
    applying a nano- or micro-structured surface on said extrusion casting roller thereby forming a nano- or micro-structured extrusion casting roller;
    maintaining a temperature of said nano- or micro-structured extrusion casting roller below a solidification temperature of said thermoplastic material, wherein said nano- or micro-structured extrusion casting roller is rotating;
    continuously applying a melt of said thermoplastic material between a counter roller and said nano- or micro-structured extrusion casting roller while said nano- or micro-structured extrusion casting roller and said counter roller are rotating; and
    moving the melt of said thermoplastic material between said nano- or micro-structured extrusion casting roller and said counter roller at a given velocity corresponding to a rotational velocity of said nano- or micro-structured extrusion casting roller while said nano- or micro-structured extrusion casting roller and said counter roller are rotating, wherein said velocity of said melt of said thermoplastic material and the rotational velocity of said nano- or micro-structured extrusion casting roller is higher than 10 meters per minute;
    wherein said melt of said thermoplastic material is solidified upon contact with said nano- or micro-structured extrusion casting roller maintained at the temperature below the solidification temperature of said melt of said thermoplastic material thereby forming a solid nano- or micro-structured thermoplastic foil.

2. The method of claim 1, wherein an aspect ratio of said solid nano- or micro-structured thermoplastic foil is above 2.

3. The method of claim 1, further comprising:
    applying a nano- or micro-structured surface on said counter roller thereby forming a nano- or micro-structured counter roller, wherein nano- or micro-structures of said nano- or micro-structured surface are produced on both sides of a cast thermoplastic foil by using both said nano- or micro-structured extrusion casting roller and said nano- or micro-structured counter roller.

4. The method of claim 1, wherein said nano- or micro-structured surface is applied by mounting nano- or micro-structured shims on said extrusion casting roller.

5. The method of claim 1, wherein the nano- or micro-structured surface is applied by coating said initial extrusion casting roller with a material which is subsequently nano- or micro-structured.

6. The method of claim 5, wherein said material is a ductile ceramic material precursor which is nano- or micro-structured by embossing, and wherein said ductile ceramic material precursor is subsequently cured to form a solid nano- or micro-structured ceramic material.

7. The method of claim 1, wherein a nano- or micro-structured area of said solid nano- or micro-structured thermoplastic foil is spatially continuous over a length higher than a circumference of said nano- or micro-structured extrusion casting roller.

8. The method of claim 1, wherein seam lines between individual nano- or micro-structured areas have a width of less than 50.

9. The method of claim 1, wherein a said nano- or micro-structuring of said solid nano- or micro-structured thermoplastic foil provides a functionality of increased contact to water angle of at least 30 degrees relative to an otherwise identical, but non-structured thermoplastic foil.

10. The method of claim 1, wherein said solid nano- or micro-structured thermoplastic foil is subsequently metalized to form isolated metal domains on top of the nano- or micro-structures with a lateral size and thickness below 1000 nm.

11. The method of claim 1, wherein said thermoplastic material is a thermoplastic polymer material or a thermoplastic semi-crystalline polymer.

12. The method of claim 1, wherein said melt of said thermoplastic material is kept in protected atmosphere to maintain chemical properties of the thermoplastic material.

13. A method for producing a solid nano- or micro-structured thermoplastic foil, comprising:
maintaining a temperature of an extrusion casting roller below a solidification temperature of a thermoplastic material, wherein the extrusion casting roller comprises a nano- or micro-structured surface and is rotating; and
continuously applying a melt of the thermoplastic material between a rotating counter roller and the rotating extrusion casting roller, wherein the melt of the thermoplastic material is solidified upon contact with the extrusion casting roller thereby forming the solid nano- or micro-structured thermoplastic foil;
wherein the melt of the thermoplastic material is moved between the rotating extrusion casting roller and the rotating counter roller at a velocity, wherein the velocity of the melt of the thermoplastic material and a rotational velocity of the rotating extrusion casting roller is higher than 10 meters per minute.

14. The method of claim 13, wherein an aspect ratio of the solid nano- or micro-structured thermoplastic foil is above 2.

15. The method of claim 13, wherein the counter roller comprises a nano- or micro-structured surface, and wherein nano- or micro-structures are produced on both sides of the solid nano- or micro-structured thermoplastic foil by using both the extrusion casting roller and the counter roller.

16. The method of claim 13, wherein the thermoplastic foil comprises at least one nano- or micro-structured surface area, the method further comprising:
providing the extrusion casting roller for an industrial polymer extrusion casting process using the thermoplastic material; and
applying the nano- or micro-structured surface on the extrusion casting roller.

17. The method of claim 16, wherein the nano- or micro-structured surface is applied by coating the extrusion casting roller with a material which is subsequently nano- or micro-structured.

18. The method of claim 17, wherein the material is a ductile ceramic material precursor which is nano- or micro-structured by embossing, and wherein the ductile ceramic material precursor is subsequently cured to form a solid nano- or micro-structured ceramic material.

* * * * *